United States Patent [19]
Boischio

[11] Patent Number: 5,975,937
[45] Date of Patent: Nov. 2, 1999

[54] CONNECTOR ASSEMBLY FOR THE WINDINGS OF A STATOR OF AN ELECTRIC MOTOR

[75] Inventor: Ido Boischio, Via San Marco, Italy

[73] Assignee: Inarca S.p.A., Vigodarzere, Italy

[21] Appl. No.: 08/938,695

[22] Filed: Sep. 26, 1997

[30] Foreign Application Priority Data

Oct. 18, 1996 [IT] Italy .................................. PD96A0255

[51] Int. Cl.⁶ ...................................................... H01R 4/24
[52] U.S. Cl. ............................................. 439/404; 439/395
[58] Field of Search ................................... 439/926, 395, 439/396, 397, 398, 399, 400, 402, 403, 404, 405, 408, 436, 437, 438, 439, 440, 441, 445, 447

[56] References Cited

U.S. PATENT DOCUMENTS

| Re. 32,898 | 4/1989 | Dechelette | 439/395 |
| 4,230,391 | 10/1980 | Keglewitsch | 439/408 |
| 4,274,696 | 6/1981 | Long et al. | 439/404 |
| 4,618,204 | 10/1986 | Saligny | 439/436 |
| 5,227,685 | 7/1993 | Krouse . | |
| 5,720,626 | 2/1998 | Dobbelaere et al. | 439/397 |

FOREIGN PATENT DOCUMENTS

| 0 765 024 | 3/1997 | European Pat. Off. . |
| 2 682 221 | 4/1993 | France . |
| 2 024 383 | 12/1971 | Germany . |
| 2 131 769 | 12/1972 | Germany . |
| 1 522 863 | 8/1978 | United Kingdom . |
| 93 05562 | 3/1993 | WIPO . |

*Primary Examiner*—Lincoln Donovan
*Attorney, Agent, or Firm*—Guido Modiano; Albert Josif

[57] ABSTRACT

A connector assembly, particularly for the windings of a stator of an electric motor, which comprises a connector element constituted by a section for anchoring to the electric motor and by a section for the guided and predefined connection of the windings to a complementary part connected to the power supply; the sections are mutually monolithic and the latter section has one or more cavities adapted to accommodate terminals for electrical connection between the stator and the power supply; the connector assembly is characterized in that each one of the terminals is constituted by a laminar body, made of conducting material, which comprises two sections which lie on mutually perpendicular planes; a first one of the sections is shaped so as to form a flap, the free end of which is in turn shaped so as to form two substantially rigid mutually opposite wings which form a slot in which two elastic tabs converge towards the bottom; the tabs are connected in an L-shaped configuration to a corresponding wing, and an electric conductor with insulating sheath can be inserted up to the free end between the elastic tabs, part of the edges of which is sharp. A second one of the sections is shaped so as to form the male element of an electrical connection to a corresponding female terminal.

14 Claims, 5 Drawing Sheets

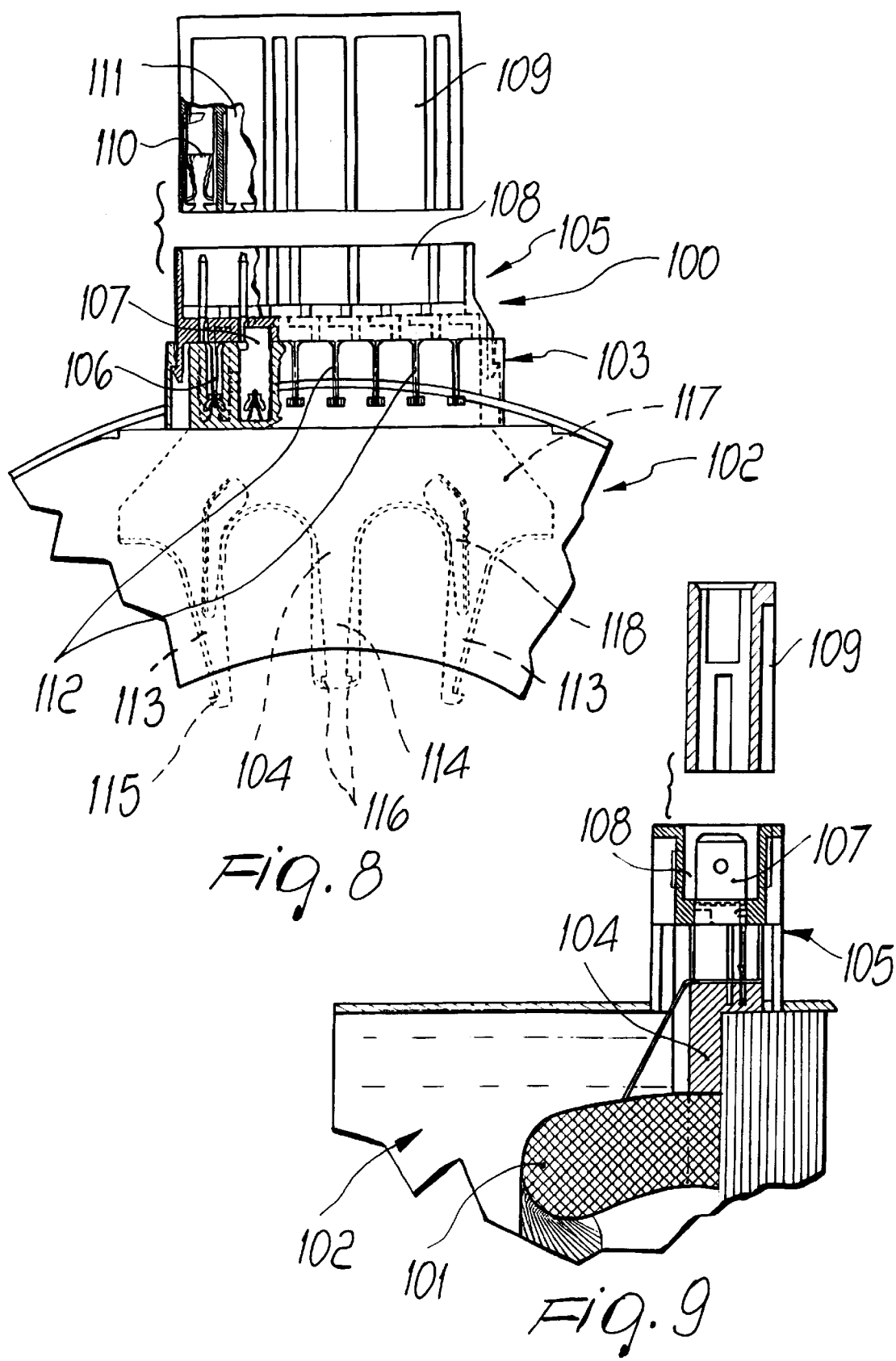

CONNECTOR ASSEMBLY FOR THE WINDINGS OF A STATOR OF AN ELECTRIC MOTOR

BACKGROUND OF THE INVENTION

The present invention relates to a connector assembly which is useful particularly but not exclusively for the windings of a stator of an electric motor.

An electric motor conventionally comprises a stator part and an axial shaft which are inside a frame; the rotor is fixed to the shaft, which is supported by bearings.

The stator part is usually constituted by a lamination pack on which a plurality of conductors are wound which form the stator windings; their end portions are connected to the mains for power supply.

Currently, as soon as the stator winding has been formed, each one of the leads of the conductors is welded to a corresponding conductor of a wiring system.

The welding points are then insulated electrically by means of tapes or sleeves.

In small- and medium-power electric motors, the leads of the stator windings are connected to a connecting terminal strip.

Both methods for connecting the stator leads to the power supply, although performing their intended aim and objects, entail drawbacks.

Among these drawbacks, particular mention must be made of an extremely labor-intensive nature, complexity in construction and structural weak points with a high risk of failure especially at the welds, with a consequent risk of shorting.

SUMMARY OF THE INVENTION

The aim of the present invention is to provide a connector assembly, particularly for the windings of a stator of an electric motor, which ensures a connection thereof to the power supply which is always optimum, without risks of failure and shorting, and at the same time is considerably simple constructively and easy to mass-manufacture.

Accordingly, an object of the present invention is to provide a connector assembly in which the cables are seated safely and precisely even in mass-manufacture assemblies.

Another object of the present invention is to provide a connector assembly in which connection to the leads of the cables arriving from the power supply is also particularly simple and quick to perform.

Another object of the present invention is to provide a connector assembly whose costs are competitive with respect to conventional ones.

Another object of the present invention is to provide a connector assembly which can be manufactured with conventional technologies and whose assembly does not require a specialized work force.

Another object of the present invention is to provide a connector in which it is possible to easily perform any maintenance operations for replacing cables and which offers substantially total safety for the operating personnel.

This aim, these objects and others which will become apparent hereinafter are achieved by a connector assembly, particularly for the windings of a stator of an electric motor, comprising a connector element constituted by a section for anchoring to the electric motor and by a section for the guided and predefined connection of the stator windings to a complementary part connected to the power supply, said sections being mutually monolithic, the latter section having one or more cavities adapted to accommodate terminals for electrical connection between the stator and the power supply, said connector assembly being characterized in that each one of said terminals is constituted by a laminar body, made of conducting material, comprising two sections which lie on mutually perpendicular planes, a first one of said sections being shaped so as to form at least one flap, the free end of said flap being in turn shaped so as to form two substantially rigid mutually opposite wings which form a slot in which two elastic tabs converge towards the bottom, said tabs being connected in an L-shaped configuration to a corresponding wing, an electric conductor with insulating sheath being insertable up to the free ends between said elastic tabs, part of the edges of which is sharp, a second one of said sections being shaped so as to form the male element of an electrical connection to a corresponding female terminal.

BRIEF DESCRIPTION OF THE DRAWINGS

Further characteristics and advantages of the present invention will become apparent from the following detailed description of three embodiments thereof and of corresponding variations, illustrated only by way of non-limitative example in the accompanying drawings, wherein:

FIG. 8 is a partially sectional orthographic projection view of a connector assembly according to the invention in a second embodiment;

FIG. 9 is another orthographic projection view of the assembly of FIG. 8;

DESCRIPTION OF THE PREFERRED EMBODIMENTS

Figure 1:
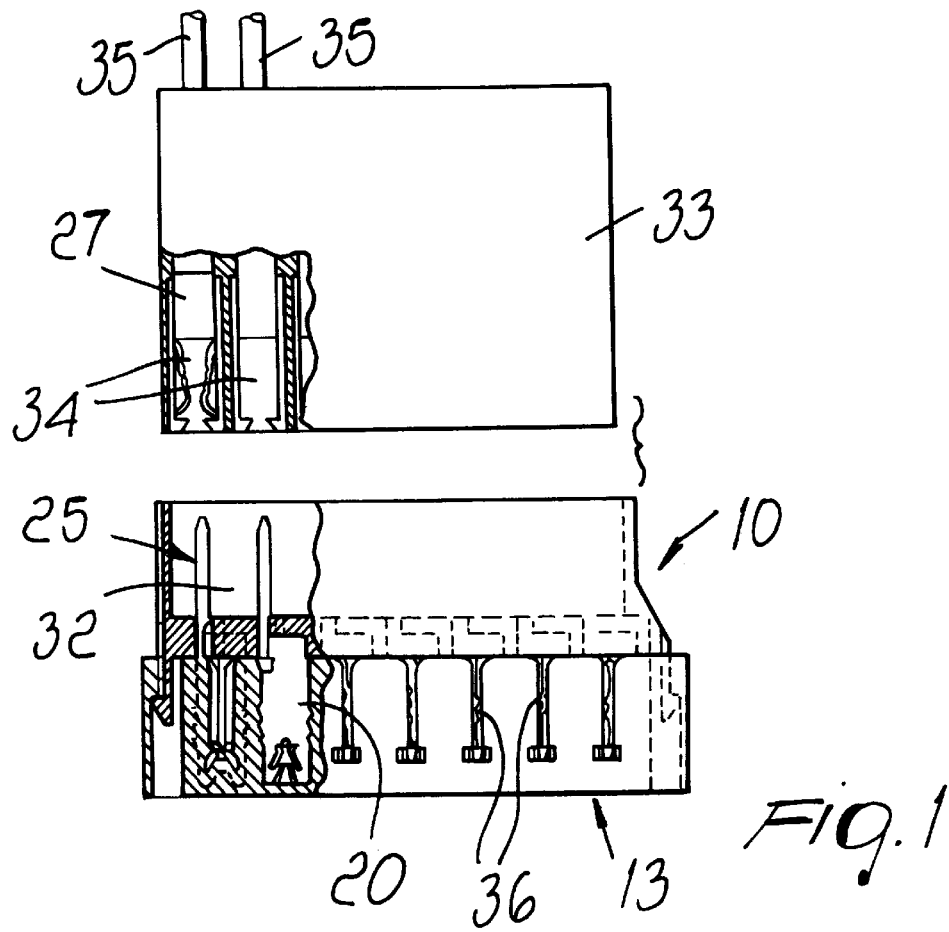
FIG. 1 is a partially sectional projection view of a connector assembly according to the invention, in a first embodiment.
Figure 2:
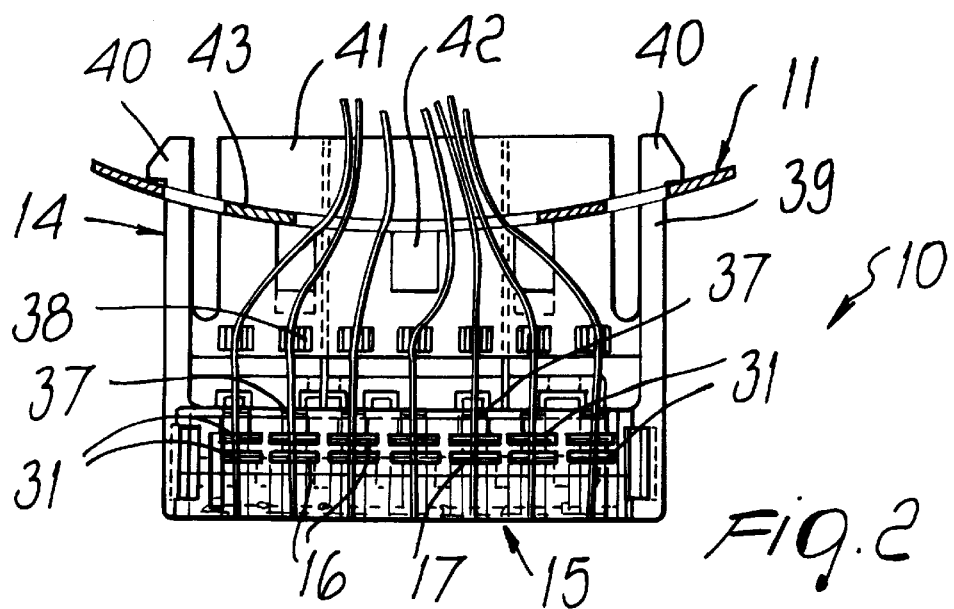
FIG. 2 is another orthographic projection view of the assembly of FIG. 1.
Figure 3:
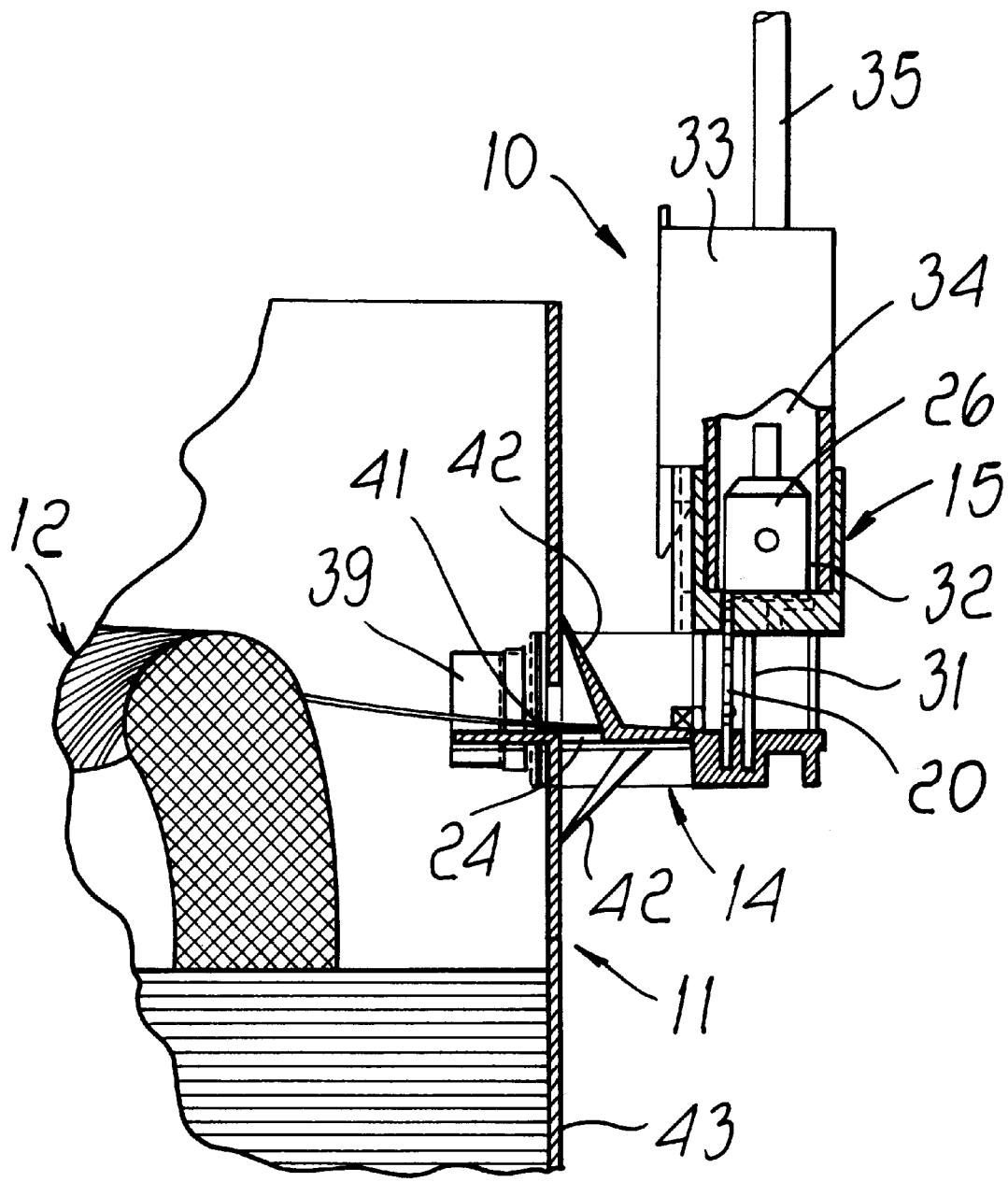
FIG. 3 is another orthographic projection view of the assembly of FIG. 1 in the operating condition.
Figure 4:
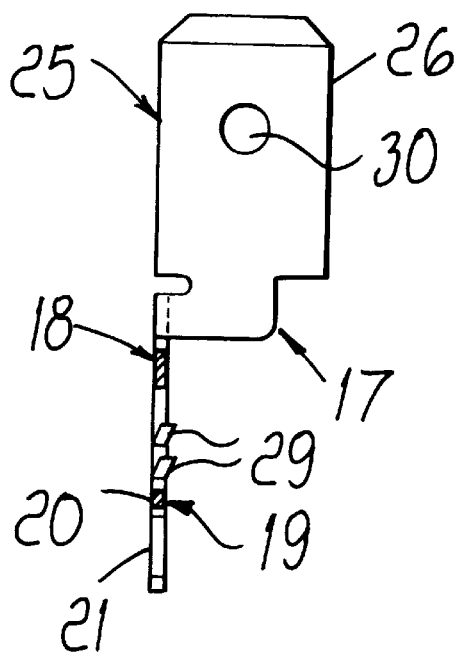
FIGS. 4 and 5 are two different orthographic projection views of a detail of the assembly of FIG. 1.
Figure 5:
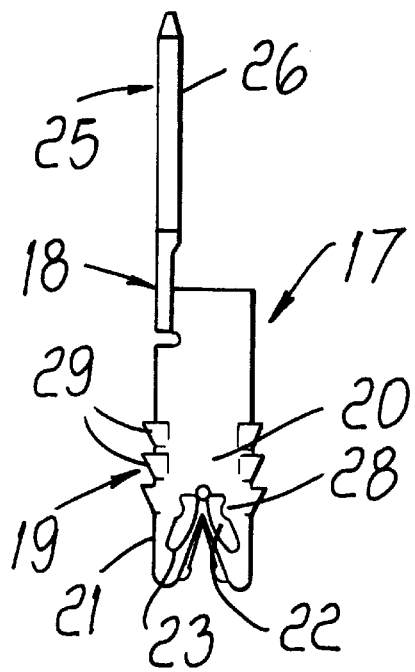

With particular reference to FIGS. 1 to 5, a connector assembly, particularly for the windings of a stator of an electric motor, according to the invention, is generally designated by the reference numeral 10 in a first embodiment.

The connector assembly 10 is indeed applied to the stator 11 of an electric motor 12, which is partially shown in the figures.

The connector assembly 10, in this embodiment, comprises a connector element 13 which is constituted by a section 14 for anchoring to the electric motor 12 and by a section 15 for connection to the stator windings; said sections are mutually monolithic and lie on perpendicular planes.

In the connection section 15, in this case, there are provided seven cavities 16 which are adapted to accommodate terminals, each designated by the reference numeral 17, adapted to provide electrical connection between the stator 11 and the power supply, not shown.

Each one of the terminals 17 is constituted by a laminar body 18 which is made of conducting material and comprises two sections which lie on mutually perpendicular planes.

A first section 19 is shaped so as to form a flap 20, whose free end is in turn shaped so as to form two mutually opposite wings 21 which are substantially rigid and form a slot 22 in which two elastic tabs 23 converge towards the bottom; said tabs are connected in a V-shaped configuration to a corresponding wing 21.

Between the tabs 23, part of the edges of which is sharp, it is possible to insert up to the free ends an electric conductor 24 with an insulating sheath (constituted, in this case, by one of the leads of the stator windings).

A second section 25 is shaped so as to form a male element 26 of an electrical connection to a corresponding female terminal 27.

In particular, the body 18 is shaped so as to form stroke limiting raised portions 28 at the edges that face the tabs 23.

The body 18 is shaped so as to form extraction-preventing tabs 29 which are arranged in pairs on the sides of the first section 19.

The second section 25 is instead shaped so as to form the flared free end, and a through hole 30 is formed therein.

The terminals 17 are formed as a whole by blanking and plastic deformation from a metal strip.

In this embodiment, the cavities 16 of the connector element 13 are shaped in particular so as to form pairs of prism-like seats 31.

In particular, for each pair of prism-like seats 31, one of the seats normally accommodates the first section 19 of a corresponding terminal 17, whilst the other seat 31 is used to provide any electrical bridges.

The connector element 13 is shaped, at the connection section, so as to form a cavity 32 onto which the cavities 16 open and in which the second sections 25 and the terminals 17 are placed; said cavity is adapted to form a guided insertion seat for a complementary part, which is connected to the power supply and in this case is constituted by a connector cover 33 which is shaped like a partial box and is inserted in said seat.

The connector cover 33 is shaped so as to form a plurality of slots 34 inside which the female terminals 27, connected to cables 35 that arrive from the power supply, can be accommodated.

In this case, the cavities 16 continue so as to form slots 36 in which the leads 37 of the stator windings can be inserted.

The leads 37 are guided in their connection by a rack 38 formed at the anchoring section 14.

In particular, the anchoring section 14 comprises two arms 39 which are provided, at their free ends, with anchoring teeth 40 and between which there is provided a base 41 with stroke limiting lugs 42.

In particular, in this case there are three stroke limiting lugs 42: a central one and two lateral ones.

The connector element 13 is particularly adapted to anchor to the frame, designated by the reference numeral 43, of the electric motor 12.

With particular reference to FIGS. 8 and 9, a connector assembly, in a second embodiment which exits at right angles to the axis of the motor, is generally designated by the reference numeral 100.

In particular, the connector assembly 100 is applied to the stator windings 101 of an electric motor 102 which is shown partially in the figures.

The connector assembly 100 comprises a connector element 103, which is constituted by a section 104 for anchoring to the stator windings 101 and by a section 105 for electrical connection to said stator windings; said sections are mutually monolithic and lie substantially on a same plane.

The connection section 105 is shaped so as to form, in this case, seven cavities 106 adapted to accommodate terminals 107 which are in turn adapted to provide the electrical connection between the stator and the power supply.

In particular, the terminals 107 are fully identical to the terminals 17, to which reference is made for a more detailed description.

The connection section 105, in this case, is continued so as to form a cavity 108 onto which the cavities 106 open; said cavity 108 is adapted to form a seat for the guided insertion of a complementary part, which is connected to the power supply and in this case is constituted by a connector cover 109, in which female terminals 110, to be connected to the corresponding terminals 107, can be accommodated.

In particular, the connector cover 109 is shaped so as to form cavities 111 wherein it is indeed possible to accommodate said female terminals 110.

Each one of the cavities 108 is also continued so as to form slots 112 wherein it is possible to conveniently insert the leads of the stator windings 101.

In this second embodiment, the anchoring section 104 is shaped so as to form three arms: two lateral ones 113 and a central one 114.

The lateral arms 113 have anchoring teeth 115 and the central arm 114 is provided with mutually opposite anchoring teeth 116.

The anchoring section 104 is shaped so as to form two wings 117 which rest against the stator windings 101 and two studs 118 for preventing overturning.

Figure 10:
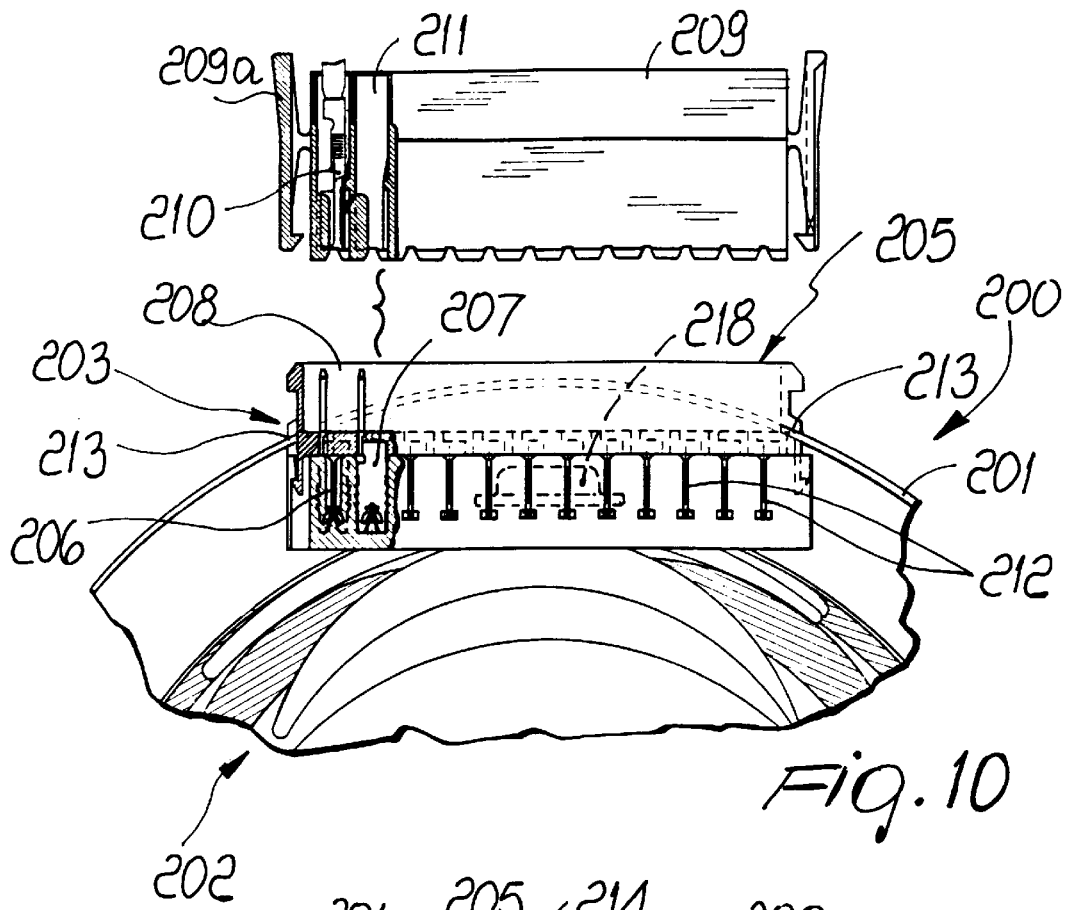
FIGS. 10 and 11 are partially sectional orthographic projection views of the connector assembly in a third embodiment.
Figure 11:
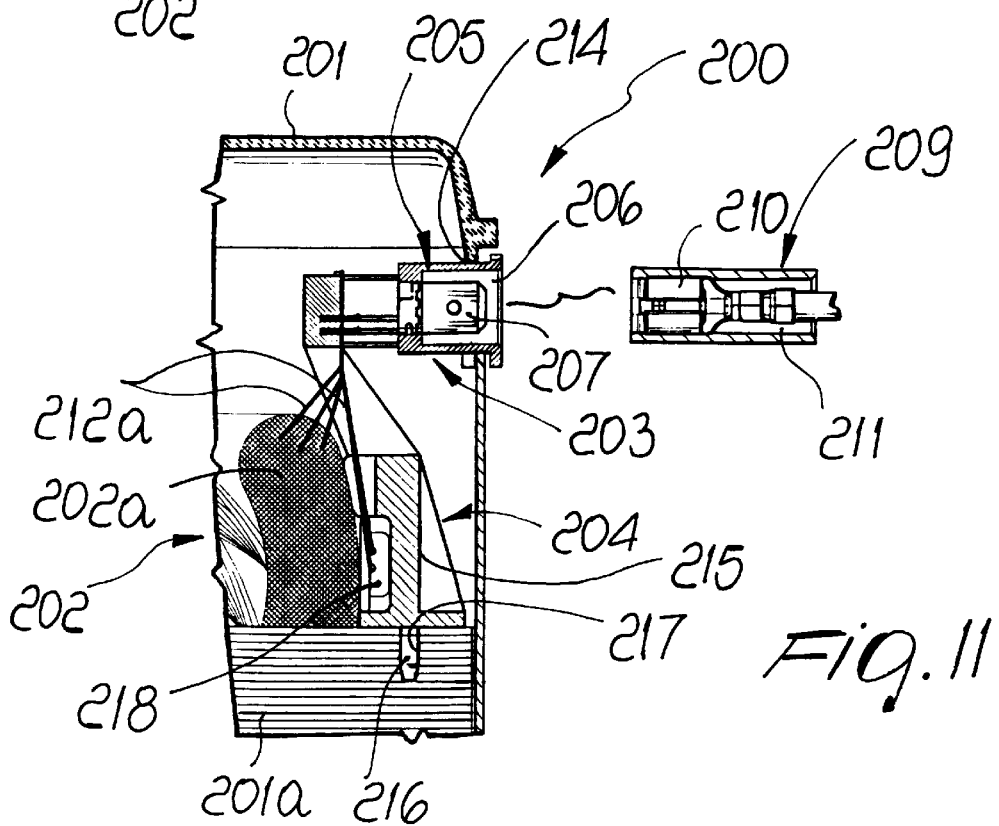

With particular reference to FIGS. 10 and 11, a connector assembly, in a third embodiment exiting at right angles to the axis of the motor, is generally designated by the reference numeral 200.

In particular, the connector assembly 200 is applied to the frame 201 and to the stator pack 201a of an electric motor 202 which is shown partially in the figures.

The connector assembly 200 comprises an element 203, which is constituted by a section 204 for anchoring to the frame 201 and to the stator pack 201a and by a section 205 for electrical connection to the stator windings 202a; said sections are mutually monolithic and lie substantially on mutually perpendicular planes.

The connection section 205 is shaped so as to form, in this case, twelve cavities 206 adapted to accommodate terminals 207 which are in turn adapted to provide the electrical connection between the stator and the power supply.

In particular, the terminals 207 are fully similar to the terminals 17, to which reference is made for a more detailed description.

The connection section 205, in this case, is continued so as to form a cavity 208 onto which the cavities 206 open; said cavity 208 is adapted to form a seat for the guided insertion of a complementary part which is connected to the power supply and in this case is constituted by a connector cover 209 which can accommodate female terminals 210 to be connected to the corresponding terminals 207.

In particular, the connector cover 209 is shaped so as to form cavities 211, inside which said female terminals 210 can be accommodated, and elastic couplings 209a for anchoring to the section 205.

Each one of the cavities 208 is continued so as to form slots 212 wherein it is conveniently possible to insert the leads 212a of the stator windings 202a.

In this second embodiment, the anchoring section 204 is shaped so as to form two lateral slots 213 which have a guided coupling, upon assembly, with the edges of a seat 214 for the connector element 203, which is formed in the frame 201.

The anchoring section 204 is continued so as to form a base 215 which lies at right angles to the connection section 205 and has, at its free end, two pins 216 which are inserted, upon assembly, in corresponding holes 217, formed in the stator pack 201a, so as to guide the anchoring of the connector element 203.

The connector assembly 200 also comprises, in this case, a conventional thermal protection element designated by the reference numeral 218.

Figure 6:
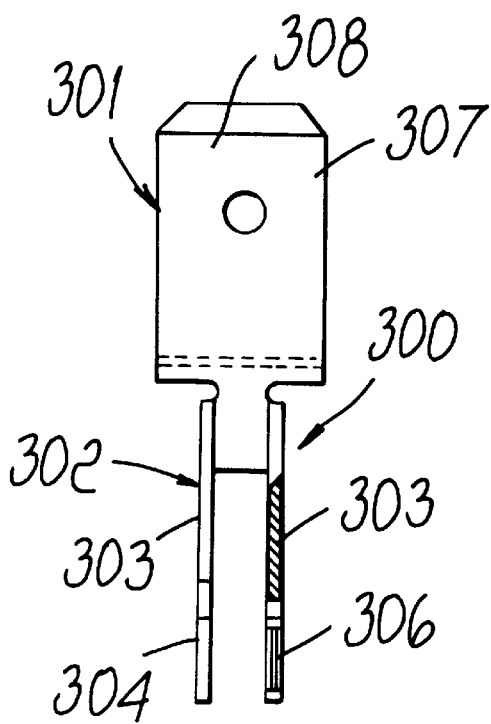
FIGS. 6 and 7 are two different orthographic projection views of a variation of the detail of FIGS. 4 and 5.
Figure 7:
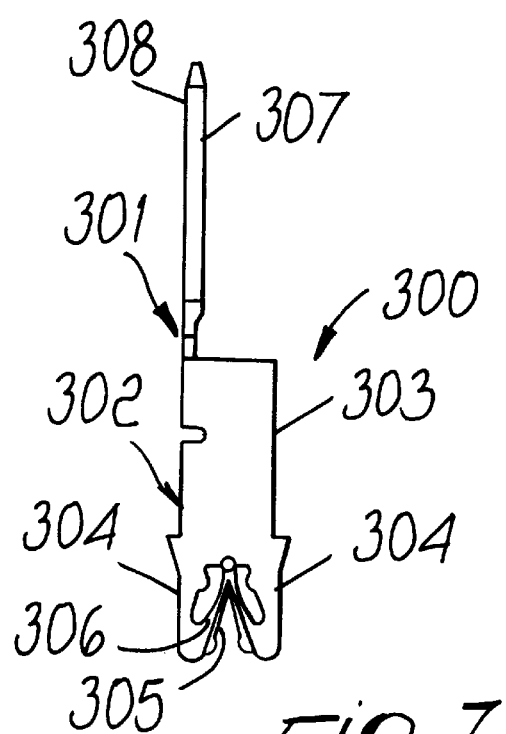

With particular reference to FIGS. 6 and 7, a variation of the terminals 17 or 107 or 207 can conveniently be applied as an alternative both to the assembly 10 and to the assemblies 100 and 200.

More specifically, in the variation of the terminal, generally designated by the reference numeral 300, the terminal is constituted by a laminar body 301 made of conducting material, which comprises two sections which lie on mutually perpendicular planes: a first section 302 is shaped so as to form two mutually facing, parallel and identical flaps 303.

The free end of each flap 303 is in turn shaped so as to form two mutually opposite substantially rigid wings 304 which form a slot 305 wherein two elastic tabs 306 convergetowards the bottom and join in a V-shaped arrangement a corresponding wing 304; an electric conductor with an insulating sheath, not shown, can be inserted up to its free ends between said two tabs, part of whose edges is sharp.

A second section 307 is shaped so as to form a male element 308 of an electrical connection with a corresponding female terminal of the previously described type.

In particular, the terminal 300 is more rigid than the male elements, with respect to the terminals of which it is a variation, during connection.

In practice, it has been observed that the present invention has solved the intended aim and objects.

In particular, it should be noted that the execution of a particular configuration of the terminals and of the connector elements allows very easy provision of the electrical connection between the stator windings and the power supply thereof.

It should also be noted that electrical connection by means of a connector assembly according to the present invention can occur without the aid of specialized personnel, since it is particularly simple and partly guided by the very structure of the elements that compose said connector assembly.

The overall structural flexibility of the connector assembly according to the invention should also be noted.

The suitability for mass manufacture of all the components that constitute the connector assembly according to the invention should also be noted.

The extreme operating safety achieved by the connector assembly according to the invention should also be noted.

The present invention is susceptible of numerous modifications and variations, all of which are within the scope of the inventive concept; likewise, all the details may be replaced with other technically equivalent elements.

The materials and the dimensions may be any according to requirements.

What is claimed is:

1. A connector assembly for the windings of a stator of an electric motor having a frame inside of which is accommodated the stator, comprising:

a connector element having an anchoring section with an inside for anchoring to the electric motor in a manner such that said connector element is rigidly connected to the frame of the electric motor and such that electrical leads of the windings of the stator may extend into said inside of said anchoring section of said connector element, said connector element further having an electrical connection section for guided and predefined connection of the electrical leads of the windings of the stator extending in said inside of said anchoring section to a complementary part connected to a power supply;

at least one terminal accommodated in both said anchoring section and said electrical connection section of said connector element for electrical connection of the electrical leads of the windings of the stator extending inside of said anchoring section to the power supply, each said at least one terminal being constituted by a laminar body made of electrically conducting material, said body comprising two sections which lie on mutually perpendicular planes, a first one of said sections of said body being shaped so as to form at least one flap, said flap having free ends thereof being shaped so as to form two mutually opposite wings, said wings forming a slot and elastic tabs connected to said wings and converging towards a bottom part of said slot, said tabs having edge parts which are sharp and being connected in a V-shaped configuration to a corresponding said wing, and a second one of said sections of said body being shaped so as to form a male element for electrical connection to a corresponding female terminal of the complementary part connected to the power supply, said at least one terminal being arranged in said connector element such that said first one of said sections extends in said anchoring section so that a respective one of the electrical leads of the windings of the stator extending inside of said anchoring section may be insertable between said elastic tabs of said first one of said sections for electrically connecting said respective one of the electrical leads of the windings of the stator to said at least one terminal, and said at least one terminal being arranged in said connector element such that said second one of said sections extends in said electrical connection section for electrically connecting said second one of said sections of said at least one terminal to the corresponding female terminal of the complementary part connected to the power supply.

2. A connector assembly according to claim 1, wherein said first one of said sections of said body of said at least one terminal comprises two mutually facing and parallel flaps.

3. A connector assembly according to claim 1, wherein said first one of said sections of said body of said at least one terminal is shaped so as to form stroke limiting raised portions at an edge thereof that faces said tabs.

4. A connector assembly according to claim 1, wherein said first one of said sections of said body of said at least one terminal is shaped so as to form extraction-preventing tabs, said extraction-prevention tabs being arranged opposite with respect to an extraction direction of said at least one terminal.

5. A connector assembly according to claim 1, wherein said at least one terminal is made of plastically-deformed blanked metal strip.

6. A connector assembly according to claim 10, wherein said anchoring section and said electrical connection section of said connector element both lie on a same plane.

7. A connector assembly according to claim 10, wherein said anchoring section and said electrical connection section of said connector element lie on mutually perpendicular planes.

8. A connector assembly according to claim 10, wherein said first one of said sections of said body of said at least one terminal is accommodated in a respective cavity provided in said anchoring section, said cavity being shaped so as to comprise prism-shaped seats.

9. A connector assembly according to claim 10, wherein said electrical connection section of said connector element comprises a main cavity in which said second one of said sections of said body of said at least one terminal extends such that the complementary part in the form of a connector cover which is at least partially box-shaped and inside which the female terminal is accommodated may be inserted in said main cavity for electrically connecting the female terminal to said second one of said sections of said body of said at least one terminal.

10. A connector assembly for the windings of a stator of an electric motor having a frame inside of which is accommodated the stator, comprising:

a connector element having an anchoring section with an inside for anchoring to the electric motor in a manner such that said connector element is rigidly connected to the frame of the electric motor and arranged outside the frame adjacent an opening in the frame and such that electrical leads of the windings of the stator accommodated inside the frame may extend from inside the frame through the opening in the frame and into said inside of said anchoring section of said connector element, said connector element further having an electrical connection section for guided and predefined connection of the electrical leads of the windings of the stator extending in said inside of said anchoring section to a complementary part connected to a power supply;

at least one terminal accommodated in both said anchoring section and said electrical connection section of said connector element for electrical connection of the electrical leads of the windings of the stator extending inside of said anchoring section to the power supply, each said at least one terminal being constituted by a laminar body made of electrically conducting material, said body comprising two sections which lie on mutually perpendicular planes, a first one of said sections of said body being shaped so as to form at least one flap, said flap having free ends thereof being shaped so as to form two mutually opposite wings, said wings forming a slot and elastic tabs connected to said wings and converging towards a bottom part of said slot, said tabs having edge parts which are sharp and being connected in a V-shaped configuration to a corresponding said wing, and a second one of said sections of said body being shaped so as to form a male element for electrical connection to a corresponding female terminal of the complementary part connected to the power supply, said at least one terminal being arranged in said connector element such that said first one of said sections extends in said anchoring section so that a respective one of the electrical leads of the windings of the stator extending inside of said anchoring section may be insertable between said elastic tabs of said first one of said sections for electrically connecting said respective one of the electrical leads of the windings of the stator to said at least one terminal, and said at least one terminal being arranged in said connector element such that said second one of said sections extends in said electrical connection section for electrically connecting said second one of said sections of said at least one terminal to the corresponding female terminal of the complementary part connected to the power supply.

11. A connector assembly for the windings of a stator of an electric motor having a frame inside of which is accommodated the stator, comprising:

a connector element having an anchoring section with an inside for anchoring to the electric motor in a manner such that said connector element is rigidly connected to the frame of the electric motor and such that electrical leads of the windings of the stator may extend into said inside of said anchoring section of said connector element, said connector element further having an electrical connection section for guided and predefined connection of the electrical leads of the windings of the stator extending in said inside of said anchoring section to a complementary part connected to a power supply;

a plurality of terminals accommodated in both said anchoring section and said electrical connection section of said connector element for electrical connection of the electrical leads of the windings of the stator extending inside of said anchoring section to the power supply, each terminal of said a plurality of terminals being constituted by a laminar body made of electrically conducting material, said body comprising two sections which lie on mutually perpendicular planes, a first one of said sections of said body being shaped so as to form at least one flap, said flap having free ends thereof being shaped so as to form two mutually opposite wings, said wings forming a slot and elastic tabs connected to said wings and converging towards a bottom part of said slot, said tabs having edge parts which are sharp and being connected in a V-shaped configuration to a corresponding said wing, and a second one of said sections of said body being shaped so as to form a male element for electrical connection to a corresponding female terminal of a plurality of female terminals of the complementary part connected to the power supply, said each terminal of said plurality of terminals being arranged in said connector element such that said first one of said sections extends in said anchoring section so that a respective one of the electrical leads of the windings of the stator extending inside of said anchoring section may be insertable between said elastic tabs of said first one of said sections for electrically connecting said respective one of the electrical leads of the windings of the stator to said each terminal of said plurality of terminals, and said each terminal of said plurality of terminals being arranged in said connector element such that said second one of said sections extends in said electrical connection section for electrically connecting said second one of said sections of said each terminal of said plurality of terminals to the corresponding female terminal of the complementary part connected to the power supply;

said electrical connection section of said connector element comprising a main cavity in which said second one of said sections of said body of said each terminal of said plurality of terminals extends such that all of said second ones of said sections of said plurality of terminals extend in said main cavity in mutually parallel planes and such that the complementary part in the form of a connector cover which is at least partially box-shaped and inside which the female terminals are accommodated may be inserted in said main cavity for electrically connecting the female terminals to said second ones of said sections of said plurality of terminals.

12. A connector assembly according to claim 11, wherein said anchoring section and said electrical connection section of said connector element both lie on a same plane.

13. A connector assembly according to claim 11, wherein said anchoring section and said electrical connection section of said connector element lie on mutually perpendicular planes.

14. A connector assembly according to claim 11, wherein said first one of said sections of said body of said each terminal of said plurality of terminals is accommodated in a respective cavity provided in said anchoring section, said cavity being shaped so as to comprise prism-shaped seats.

* * * * *

UNITED STATES PATENT AND TRADEMARK OFFICE
CERTIFICATE OF CORRECTION

PATENT NO. : 5,975,937
DATED : November 2, 1999
INVENTOR(S) : Boischio, Ido

It is certified that error appears in the above-identified patent and that said Letters Patent is hereby corrected as shown below:

Title page, item [75], inventor: should be Ido Boischio, Padova, Italy.

Signed and Sealed this

Twelfth Day of September, 2000

Attest:

Q. TODD DICKINSON

Attesting Officer      Director of Patents and Trademarks